(12) United States Patent
Kang et al.

(10) Patent No.: US 8,473,728 B2
(45) Date of Patent: *Jun. 25, 2013

(54) INTERRUPT HANDLING

(75) Inventors: Jack Kang, Sunnyvale, CA (US);
Hsi-Cheng Chu, San Jose, CA (US);
Yu-Chi Chuang, Jhubei (TW)

(73) Assignee: Marvell World Trade Ltd., St. Michael (BB)

( * ) Notice: Subject to any disclaimer, the term of this patent is extended or adjusted under 35 U.S.C. 154(b) by 0 days.

This patent is subject to a terminal disclaimer.

(21) Appl. No.: 13/479,788

(22) Filed: May 24, 2012

(65) Prior Publication Data

US 2012/0239915 A1    Sep. 20, 2012

Related U.S. Application Data

(63) Continuation of application No. 12/987,716, filed on Jan. 10, 2011, now Pat. No. 8,190,866, which is a continuation of application No. 11/838,075, filed on Aug. 13, 2007, now Pat. No. 7,870,372.

(60) Provisional application No. 60/822,340, filed on Aug. 14, 2006.

(51) Int. Cl.
*G06F 9/40* (2006.01)

(52) U.S. Cl.
USPC .............................. 712/244; 712/40; 712/228

(58) Field of Classification Search
USPC ..................... 712/40, 228, 233, 244
See application file for complete search history.

(56) References Cited

U.S. PATENT DOCUMENTS

| | | | |
|---|---|---|---|
| 5,944,816 A | 8/1999 | Dutton et al. | |
| 6,061,710 A | 5/2000 | Eickemeyer et al. | |
| 6,631,394 B1 | 10/2003 | Ronkka et al. | |
| 6,779,065 B2 | 8/2004 | Murty et al. | |
| 6,804,631 B2 | 10/2004 | Kelley et al. | |
| 7,120,783 B2 * | 10/2006 | Fotland et al. | 712/228 |
| 7,334,086 B2 * | 2/2008 | Hass et al. | 711/123 |
| 7,346,757 B2 * | 3/2008 | Hass et al. | 711/207 |
| 7,461,213 B2 * | 12/2008 | Hass et al. | 711/147 |
| 7,461,215 B2 * | 12/2008 | Hass | 711/154 |
| 7,467,243 B2 * | 12/2008 | Rashid et al. | 710/52 |
| 7,487,503 B2 * | 2/2009 | Accapadi et al. | 718/103 |
| 7,702,889 B2 * | 4/2010 | Codrescu et al. | 712/244 |
| 7,913,255 B2 * | 3/2011 | Codrescu | 718/101 |
| 7,984,268 B2 * | 7/2011 | Hass et al. | 712/214 |
| 2002/0103847 A1 | 8/2002 | Potash | |
| 2003/0046464 A1 | 3/2003 | Murty et al. | |

(Continued)

FOREIGN PATENT DOCUMENTS

WO    WO0070482 A1    11/2000

*Primary Examiner* — Aimee Li (57) ABSTRACT

Techniques for handling interrupts of multiple instruction threads within a multi-thread processing environment. The techniques include: interleavingly fetching and issuing instructions of (i) a first instruction execution thread and (ii) a second instruction thread for execution by an execution block of the multi-thread processing environment; providing a first interrupt signal via a first interrupt signal line within the multi-thread processing environment to interrupt fetching and issuing of instructions of the first instruction execution thread; and providing a second interrupt signal via a second interrupt signal line within the multi-thread processing environment to interrupt fetching and issuing of instructions of the second instruction execution thread. The first interrupt signal line and the second interrupt signal line are physically separate and distinct signal lines that are directly electrically coupled to one another.

18 Claims, 6 Drawing Sheets

U.S. PATENT DOCUMENTS

| | | |
|---|---|---|
| 2003/0088854 A1 | 5/2003 | Wygodny et al. |
| 2003/0217189 A1 | 11/2003 | Kelley et al. |
| 2004/0088710 A1 | 5/2004 | Ronkka et al. |
| 2004/0215937 A1 | 10/2004 | Burky et al. |
| 2005/0033831 A1* | 2/2005 | Rashid .......................... 709/220 |
| 2005/0044308 A1* | 2/2005 | Rashid et al. ................. 711/112 |
| 2005/0044324 A1* | 2/2005 | Rashid et al. ................. 711/122 |
| 2005/0102458 A1 | 5/2005 | Ober et al. |
| 2006/0161921 A1 | 7/2006 | Kissell |
| 2006/0190945 A1 | 8/2006 | Kissell |

* cited by examiner

INTERRUPT HANDLING

CROSS REFERENCE TO RELATED APPLICATIONS

The present application is a continuation of U.S. application Ser. No. 12/987,716, filed Jan. 10, 2011, entitled "Interrupt Handling," which is a continuation of U.S. application Ser. No. 11/838,075, filed Aug. 13, 2007, (now U.S. Pat. No. 7,870,372, issued Jan. 11, 2011), which claims the benefit of U.S. Provisional Patent Application No. 60/822,340, filed Aug. 14, 2006. The disclosures of the applications referenced above are incorporated herein by reference.

TECHNICAL FIELD

Embodiments of the present invention relate to the field of data processing, in particular, to techniques for handling interrupts of multiple instruction execution threads.

BACKGROUND

Modern multi-core processors have multiple pipelines to run multiple applications and as a result often improve performance for a system simultaneously running multiple tasks. Unfortunately, these multi-core processors also require substantially more power and use more area than a comparable single pipeline processor.

Prior art single pipeline processors may allow multi-thread processing by employing an operating system to manage hardware resource usage and thread switching However, a significant performance penalty is incurred each time the processor changes threads, including context changes associated with interrupt handling. These processors generally include a single set of interrupt lines for providing interrupt requests to the processor, possibly leading to increased system inefficiency.

SUMMARY OF THE INVENTION

In view of the problems in the state of the art, embodiments of the invention are directed to optimizing interrupt handling for multiple instruction threads during an instruction execution period. A processing system is also described, suitable to solve the problems which at least one embodiment of the invention is based on, with an execution block to execute instructions, a fetch block to fetch and issue instructions of the various instruction execution threads, and one or more interrupt blocks to provide interrupt signals to the fetch block, including a first interrupt signal line corresponding to a first instruction execution thread and a second interrupt signal line corresponding to a second instruction execution thread.

More specifically, with the foregoing and other items in view, there is provided, in accordance with various embodiments of the invention, a method for interrupt handling including fetching and issuing instructions corresponding to a first instruction execution thread to an execution block for execution, and fetching and issuing instructions corresponding to a second instruction execution thread to an execution block for execution. The method may further include stopping the fetching and issuing of instructions of a selected one of the first and second instruction execution threads in response to an interrupt signal corresponding to the selected instruction execution thread, and processing instructions of an interrupt service routine in response to the interrupt signal.

In another embodiment, the method may include disabling fetching and issuing of instructions of the non-selected instruction execution thread while processing the instructions of the interrupt service routine for the selected instruction execution thread.

In accordance with another embodiment of the invention, the method may include stopping the fetching and issuing of instructions of the non-selected instruction execution thread immediately in response to an interrupt signal corresponding to the non-selected instruction execution thread, and switching to fetching and issuing instructions of the same interrupt service routine.

In another embodiment, the method may include processing an interrupt for the first instruction execution thread by fetching and issuing instructions of a first interrupt service routine located at a first memory address, and processing an interrupt for the second instruction execution thread by fetching and issuing instructions of a second interrupt service routine located at a second memory address different from the first memory address.

A processing device is also described, suitable to solve the problems which at least one embodiment of the invention is based on, with an execution means to execute instructions, an instruction dispatch means to fetch and issue instructions of the various instruction execution threads, and one or more interrupt means for interrupting the instruction dispatch means, including a first interrupt signaling means corresponding to a first instruction execution thread and a second interrupt signaling means corresponding to a second instruction execution thread.

In one embodiment, the execution means may include any instruction execution means such as a processing core co-disposed in an integrated circuit package with the instruction dispatch means. In one embodiment, the instruction dispatch means may include at any instruction dispatch means, such as an instruction unit responsible for ensuring that instructions are properly decoded, fetched, queued, and dispatched for execution. Besides containing control circuitry for performing these functions, the instruction dispatch means may also include a storage means, such as an instruction cache and/or a data cache.

In accordance with again an additional feature of at least one embodiment of the invention, the processing device is a processor. In accordance with still a further feature of at least one embodiment of the invention, the processing device is an embedded processor. In accordance with a concomitant feature of the invention, the processing device is an integrated circuit.

Other features that are considered as characteristic for embodiments of the invention are set forth in the appended claims.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use the phrases "in an embodiment," "in embodiments," or "in various embodiments," which may each refer to one or more of the same or different embodiments. Furthermore, the terms "comprising," "including," "having," and the like, as used with respect to embodiments of the present invention, are synonymous. The phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)." For the purposes of the present invention, the phrase "(A)B" means "(B) or (AB)," that is, A is an optional element.

"Circuitry," as used in any embodiment herein, may comprise, for example, singly or in any combination, hardwired circuitry, programmable circuitry, state machine circuitry, and/or firmware that stores instructions executed by programmable circuitry.

Figure 1:
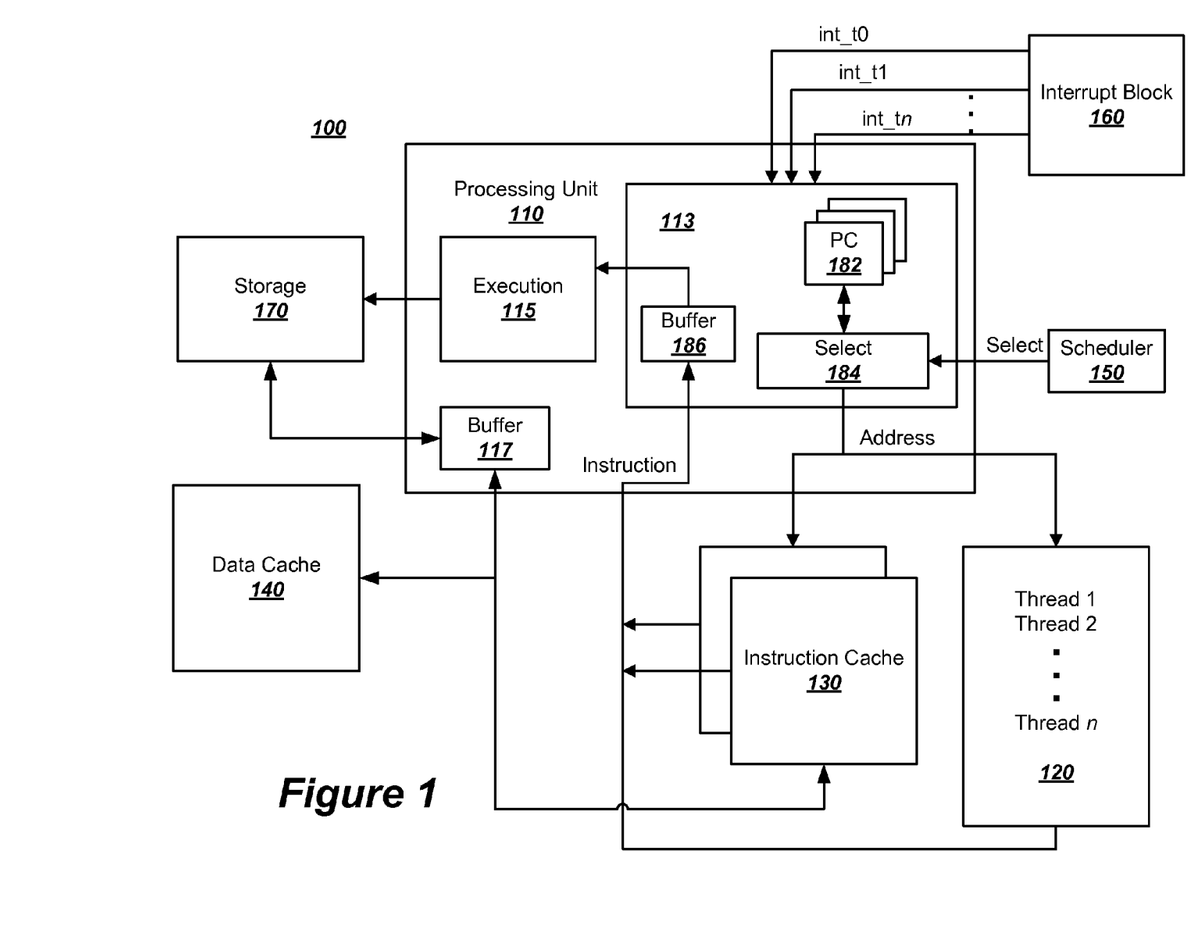
FIG. 1 illustrates a block diagram of a multi-thread system in accordance with various embodiments of the present invention.

Referring to FIG. 1, a block diagram illustrates an exemplary multi-thread processing environment 100 having a multi-thread processing unit 110 with an execution block 115, a fetch block 113, and interrupt block 160 that are coupled to each other at least as shown. In alternate embodiments, the present invention may be practiced with other processing environments and may include various system devices in addition to or instead of the illustrated system devices.

In various embodiments, a processing unit 110 includes an execution block 115 to execute instructions and a fetch block 113 to fetch and issue instructions for execution by the execution block 115. The fetch block 113 is configured to fetch and issue instructions from multiple instruction execution threads. The fetch block 113 fetches and issues instructions from at least a first instruction execution thread and a second instruction execution thread, for execution by the execution block 115.

In one embodiment, the fetch block 113 is operatively coupled to the execution block 115 and includes at least one program counter 182 for each instruction execution thread to interleave the threads and to switch the processing unit 110 between threads by switching which program counter 182 provides the next instruction. In alternate embodiments, the present invention may be practiced with other instruction dispatch devices.

The multi-thread processing environment 100 also illustrates various closely associated system devices, which are operatively coupled to the processing unit 110 including buffers 117, 186, tightly coupled memory 120, an instruction cache 130, a data cache 140, a scheduler 150, and storage 170. The tightly coupled memory 120 is a smaller, faster memory than storage 170 and is generally configured to store a subset of instructions for at least one thread. As illustrated in FIG. 1, the tightly coupled memory 120 may be shared by the multiple threads, with or without partitioning for the various threads. The tightly coupled memory 120 may be used in conjunction with an embedded processor.

In various embodiments, the tightly coupled memory 120 may functionally operate as an L1 cache by providing faster response time than the instruction cache 130 or storage 170. Accordingly, when a requested thread address is found in the tightly coupled memory 120, the instruction associated with the address may not need to be retrieved from the instruction cache 130 or storage 170. A tightly coupled memory 120 may be configured to store at least a first and a second corresponding subset of instructions of first and second instruction execution threads.

An instruction cache 130 may store additional instructions associated with an instruction execution thread. In a multi-thread environment, one embodiment dynamically allocates a portion of the instruction cache to each thread. The instruction cache 130 may be configured to store at least a first and a second corresponding subset of instructions of the first and second instruction execution threads. Using an embedded processor, the instruction cache 130 may be operatively coupled to the tightly coupled memory 120 and may operate as an L2 cache. In an alternative embodiment, the tightly coupled memory 120 is merely a subset of the instruction cache 130 and the data cache 140.

Similarly, the data cache 140 may store data associated with a thread. The instruction cache 130 and data cache 140 may be dynamically allocated. Moreover, in contrast to the illustrated configuration, one embodiment enables the instruction cache 130 and data cache 140 to be co-located in the same cache.

In one embodiment, upon determining that a cache miss has occurred for either the instruction cache 130 or the data cache 140, the processing unit 110 is configured to allow a second thread to use the processing unit 110 while a first thread waits for data to be retrieved from a remote memory location, such as storage 170.

Storage 170 may include semiconductor firmware memory, programmable memory, non-volatile memory, read only memory (ROM), electrically programmable memory, random access memory (RAM), flash memory (which may include, for example, NAND or NOR type memory structures), magnetic disk memory, and/or optical disk memory. Either additionally or alternatively, storage 170 may comprise other and/or later-developed types of computer-readable memory including electrical, optical, acoustical or other form of propagated signals (e.g., carrier waves, infrared signals, digital signals). Machine-readable firmware program instructions may be stored in storage 170. Storage 170 may include any storage medium or machine-accessible medium and/or any storage mechanism that provides (i.e., stores and/or transmits) information in a form readable by a machine (e.g., a computer).

In one embodiment, a scheduler 150 controls the interleaving fetching and issuing of instructions by the fetch block 113. The scheduler 150 may output an instruction execution thread selection signal to a select block 184 in the fetch block 113 to control interleavingly fetching and issuing of instructions by the fetch block 113. The scheduler 150 controls interleavingly fetching and issuing of instructions by the fetch block 113, based at least in part on corresponding contiguous execution clock cycle allocations of the instruction execution threads. The fetch block 113 is adapted to fetch and issue at least one instruction from an instruction cache 130 for a selected one of the first and second instruction execution threads each time the fetch block 113 is signaled by the scheduler 150 to fetch instructions for the selected one of the first and second instruction execution threads.

In one embodiment, the processing system 100 includes interrupt block 160 to interrupt the fetch block 113. An interrupt may be initiated on behalf of an instruction execution thread associated with an application and/or an operating system. Interrupt block 160 may provide one or more interrupt signals to the fetch block 113, and in various embodiments, interrupt signals may be provided via interrupt signal lines int_t0, int_t1, . . . int_tn (from an interrupt signaling source, for example).

The interrupt block 160, in one embodiment, delivers interrupts associated with a specific instruction execution thread. For example, interrupt block 160 may include first interrupt signal lines int_t0, int_t1, . . . or int_tn corresponding to first instruction execution threads and second interrupt signal lines int_t0, int_t1, . . . or int_tn corresponding to second instruction execution threads. For example, as illustrated, interrupt block 160 includes interrupt signal lines int_t0, int_t1, . . . int_tn, and in the illustrated exemplary embodiment, interrupt signal line int_t0 may correspond to a master instruction execution thread, interrupt signal line int_t1 may correspond to a first instruction execution thread, and interrupt signal line int_tn may correspond to an $n^{th}$ instruction execution thread.

In some embodiments, an instruction execution thread may be associated with at least two interrupt signal lines including, for example, an interrupt request (IRQ) signal line and a fast interrupt request (FIQ) signal line. IRQ and FIQ signal lines may be prioritized such that an interrupt service routine initiated by one of the interrupt signals may be interrupted by the other, but not necessarily vice versa. For example, in various architectures, an interrupt initiated by an IRQ signal may be interrupted by an FIQ signal, but an interrupt initiated by an FIQ signal may not necessarily be allowed to be interrupted by an IRQ signal. In other embodiments, however, prioritizing schemes may or may not be enlisted.

Upon receiving an interrupt signal, multi-thread processing unit 110 may be variously adapted to handle the interrupt. Upon receiving an interrupt signal, fetch block 113 may be adapted to process the interrupt, for example, by fetching and issuing instructions of at least one interrupt service routine. An interrupt service routine may be one or more instructions adapted to service a particular interruption signal source (e.g., a device requesting or requiring attention). Instructions associated with an interrupt service routine may be located anywhere in multi-thread processing environment 100, including, for example, tightly coupled memory 120 and/or instruction cache 130.

Figure 2:
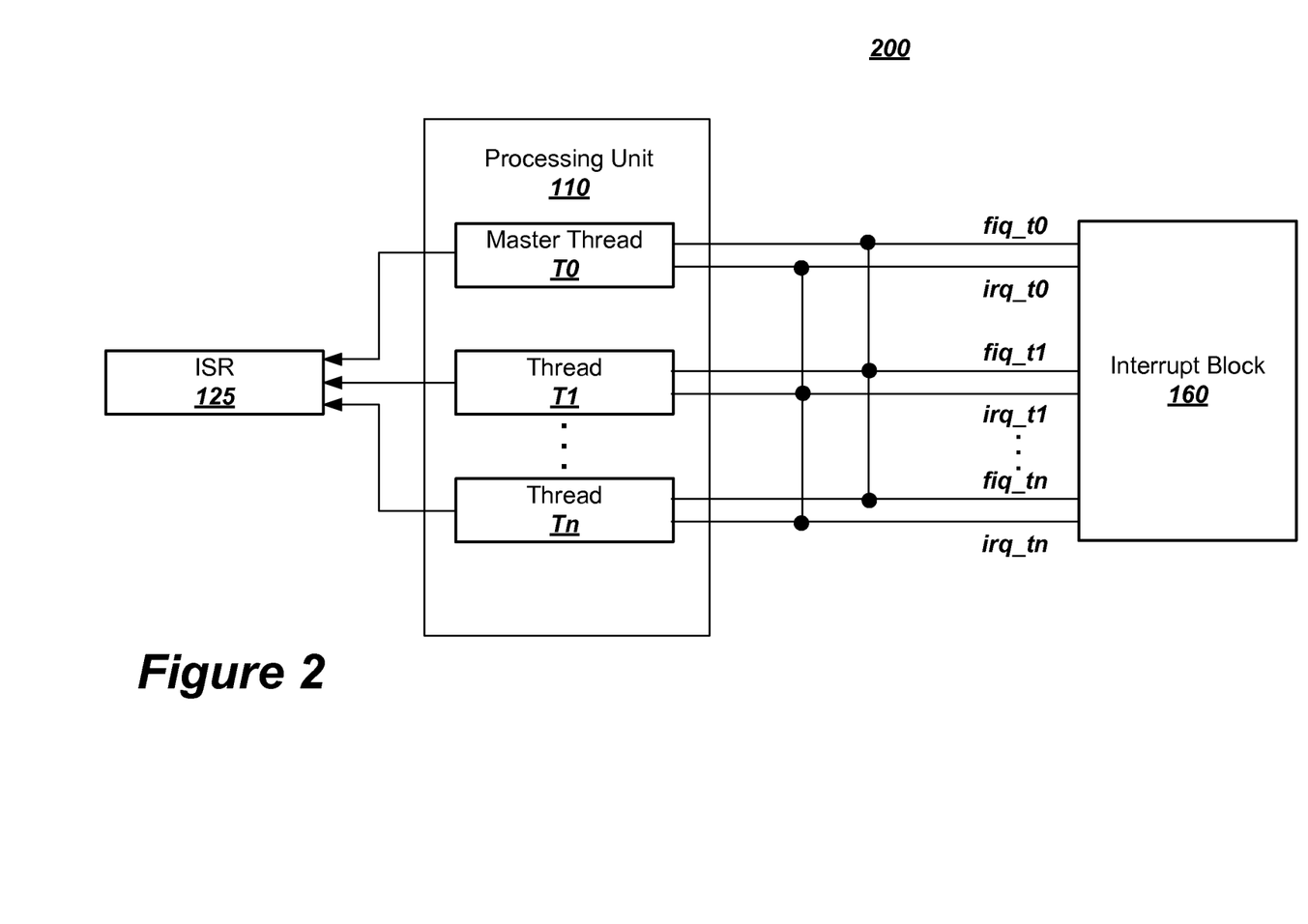
FIG. 2 illustrates a block diagram of interrupt handling of a multi-thread device in accordance with various embodiments of the present invention.

Turning now to FIG. 2, illustrated is an embodiment of a multi-thread processing system 200. Multi-thread processing system 200 may be configured such that interrupt service routine (ISR) 125 may be shared among all instruction execution threads T0, T1, . . . Tn by coupling the interrupt signal lines fiq_t0, fiq_t1, . . . fiq_tn, and irq_t0, irq_t1, . . . irq_tn, as illustrated. As illustrated, FIQ signal lines are coupled to each other, and IRQ signal lines are coupled to each other, so that any one of the instruction execution threads can process interrupt service routine 125 (i.e., running the interrupt service routine 125 against the instruction execution thread's own processing cycles) even if an interrupt signal is received by the fetch block for another one of the instruction execution threads. It is noted that the depicted embodiment illustrates n number of instruction execution threads T0, T1, . . . Tn, which may include any number of instruction execution threads, depending on the application. It is also noted that although the depicted embodiment illustrates two interrupt signal lines fiq_t0, irq_t0, . . . fiq_tn, irq_tn per thread T0, T1, . . . Tn, various embodiments of multi-thread devices may include more or less interrupt signal lines per thread and/or different priorities of interrupt signal lines.

Still referring to FIG. 2, sharing may be effected by adapting processing device 110 (e.g., via fetch block 113 as previously described with reference to FIG. 1) to fetch and issue the interrupt service routine 125 located at a particular address of the memory (e.g., tightly coupled memory 120 or instruction cache 130 as previously described with reference to FIG. 1) upon receiving an interrupt signal fiq_t0, irq_t0, . . . fiq_tn, irq_tn corresponding to any of instruction execution threads T0, T1, . . . Tn. In embodiments, for example, processing device 110 may be adapted to immediately switch to fetching and issuing instructions for the shared interrupt service routine 125 upon receipt of an interrupt for the master instruction execution thread T0 while processing device 110 is fetching and issuing instructions for an instruction execution thread other than the master instruction execution thread T0 (e.g., thread T1 or thread Tn). Such a configuration may improve response time by not requiring the processing device 110 to complete processing of a thread if an interrupt is received for another thread.

Figure 3:
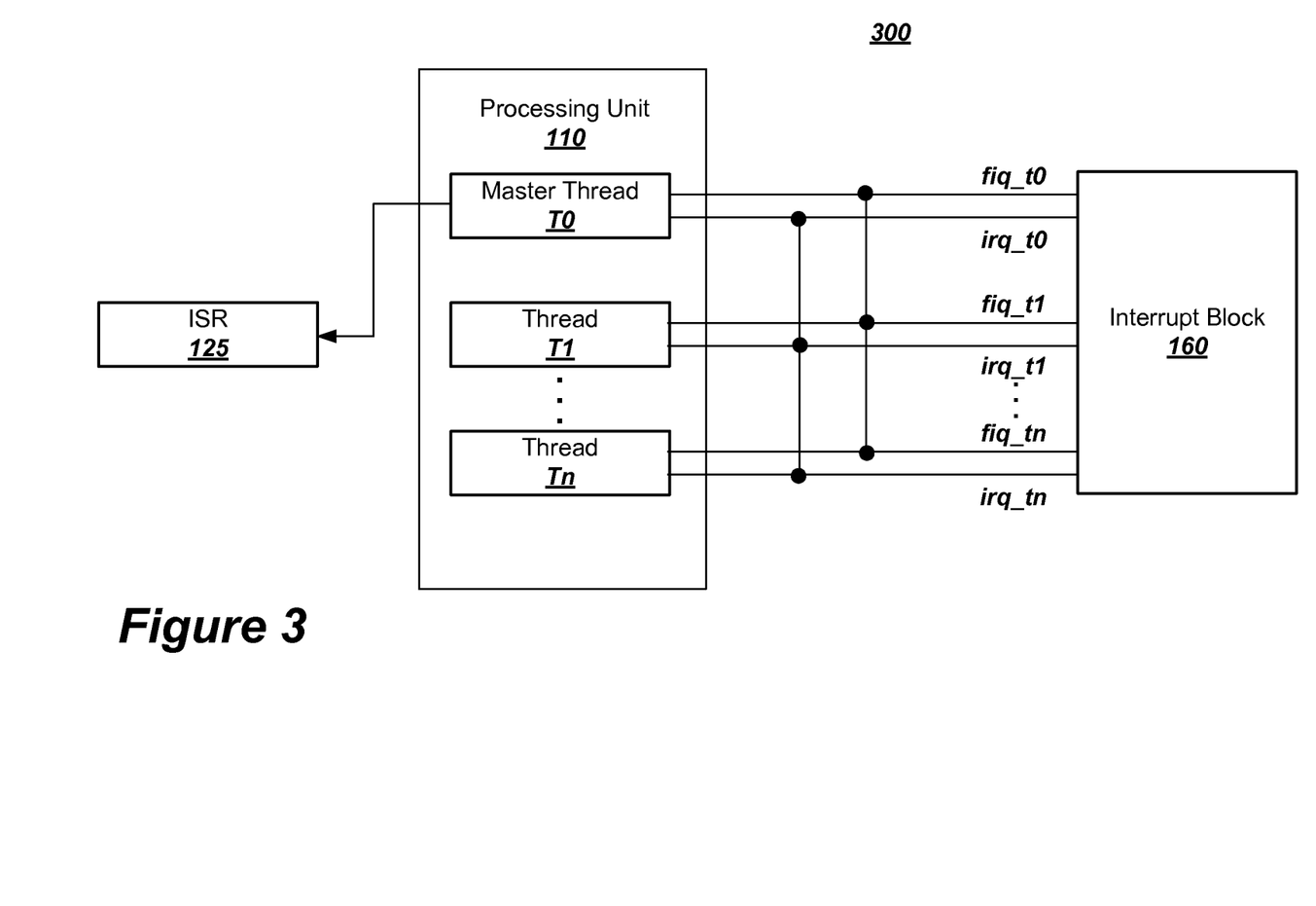
FIG. 3 illustrates a block diagram of interrupt handling of another multi-thread device in accordance with various embodiments of the present invention.

In accordance with another embodiment and as illustrated in FIG. 3, interrupt servicing may be limited to one or more of the instruction execution threads T0, T1, . . . Tn. One or more of the instruction execution threads T0, T1, . . . Tn not handling interrupts may be masked (disabled) from processing interrupts. For example, in the embodiment illustrated in FIG. 3, instruction execution threads T1 . . . Tn are masked and thus will not handle any incoming interrupts fiq_t1, irq_t1, . . . fiq_tn, irq_tn associated therewith. If while processing a masked instruction execution thread T1 . . . Tn processing device 110 receives an interrupt fiq_t1, irq_t1, . . . fiq_tn, irq_tn corresponding to the masked instruction execution threads T1 . . . Tn, the masked instruction execution thread T1 . . . Tn may ignore the interrupt fiq_t1, irq_t1, . . . fiq_tn, irq_tn. When the processing device 110 finishes fetching and issuing instructions associated with the masked instruction execution thread T1 . . . Tn, and switches to an unmasked thread T0, either immediately or after some amount of time/processing, the unmasked master thread T0 may then handle the interrupt fiq_t1, irq_t1, . . . fiq_tn, irq_tn associated with the masked instruction execution thread T1 . . . Tn. In other embodiments, however, the interrupt fiq_t1, irq_t1, . . . fiq_tn, irq_tn associated with the masked instruction execution thread T1 . . . Tn may instead be ignored or queued into a buffer (e.g., buffer 117 as previously described with reference to FIG. 1) for later processing upon switching to the unmasked master thread T0, depending on the particular application.

In accordance with another embodiment, if while processing the unmasked master thread T0 processing device 110 receives an interrupt fiq_t1, irq_t1, . . . fiq_tn, irq_tn corresponding to one of the masked instruction execution threads T1 ... Tn, the processing device 110 may respond in any number of ways. For example, the processing device 110 may ignore the interrupt fiq_t1, irq_t1, ... fiq_tn, irq_tn. The processing device 110 may instead queue the interrupt fiq_t1, irq_t1, ... fiq_tn, irq_tn into a buffer for later processing upon completion of processing of unmasked master thread T0. In other embodiments, the processing device 110 may respond by immediately switching to handle the interrupt fiq_t1, irq_t1, ... fiq_tn, irq_tn without completing, at least at that time, processing of unmasked master thread T0.

Figure 4:
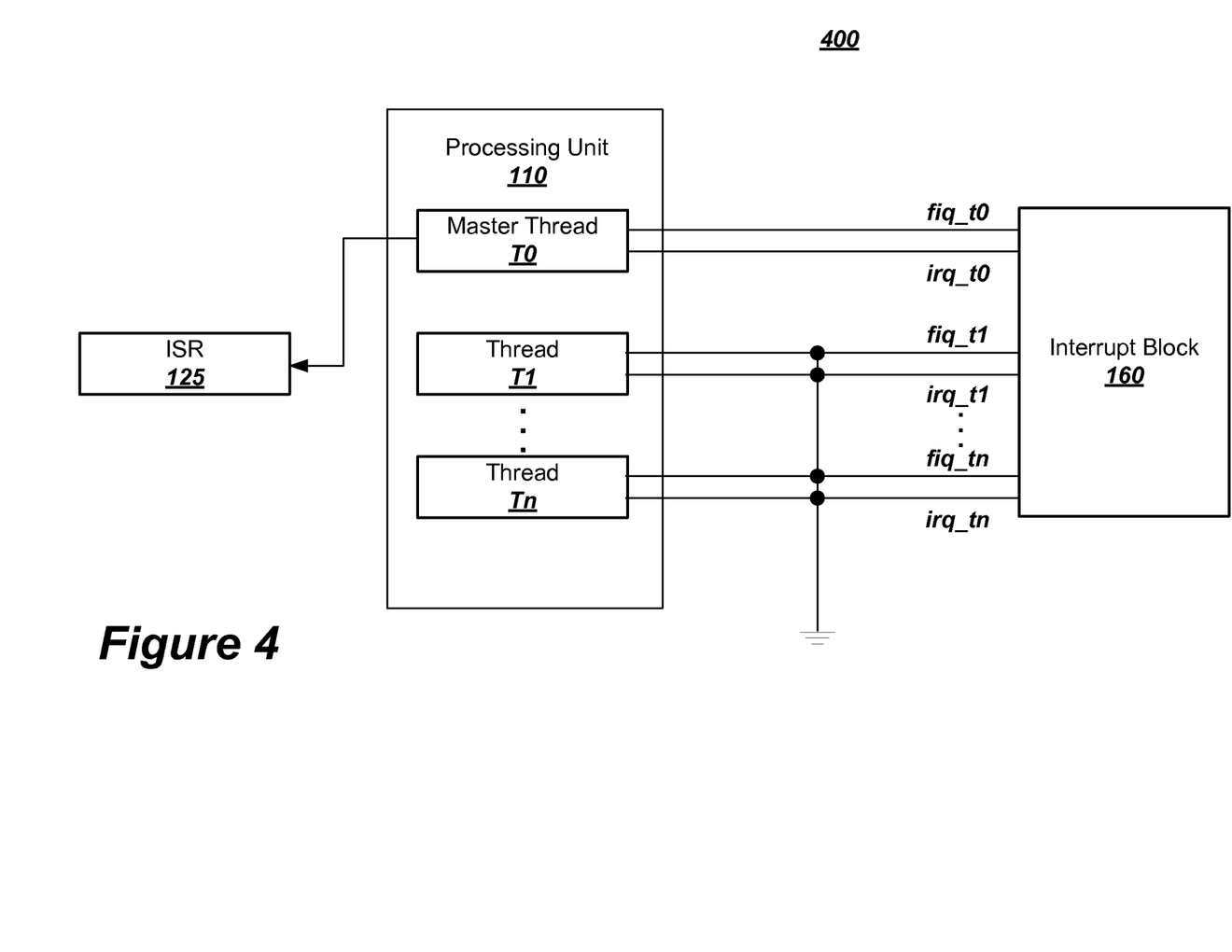
FIG. 4 illustrates a block diagram of interrupt handling of another multi-thread device in accordance with various embodiments of the present invention.

Referring now to FIG. 4, illustrated is another embodiment of a multi-thread device 400. In the embodiment, similar to the embodiment previously described with reference to FIG. 3, interrupt servicing may be limited to one or more of the instruction execution threads T0, T1, ... Tn. In the illustrated embodiment, however, multi-thread device 400 is configured to so limit (disable) interrupt servicing by coupling one or more of the instruction execution threads T1, ... Tn to ground so that it is impossible for the instruction execution threads T1, ... Tn to receive an incoming interrupt fiq_t1, irq_t1, ... fiq_tn, irq_tn. In embodiments, if while processing a disabled instruction execution thread T1 ... Tn processing device 110 receives an interrupt fiq_t1, irq_t1, ... fiq_tn, irq_tn corresponding to the disabled instruction execution threads T1 ... Tn, the disabled instruction execution thread T1 ... Tn may ignore the interrupt fiq_t1, irq_t1, ... fiq_tn, irq_tn. When the processing device 110 finishes fetching and issuing instructions associated with the disabled instruction execution thread T1 ... Tn, and switches to an enabled thread T0, either immediately or after some amount of time/processing, the enabled master thread T0 may then handle the interrupt fiq_t1, irq_t1, ... fiq_tn, irq_tn associated with the masked instruction execution thread T1 ... Tn. In other embodiments, however, the interrupt fiq_t1, irq_t1, ... fiq_tn, irq_tn associated with the disabled instruction execution thread T1 ... Tn may instead be ignored or queued into a buffer (e.g., buffer 117 as previously described with reference to FIG. 1) for later processing upon switching to the enabled master thread T0, depending on the particular application.

In accordance with another embodiment, if while processing the enabled master thread T0 processing device 110 receives an interrupt fiq_t1, irq_t1, ... fiq_tn, irq_tn corresponding to one of the disabled instruction execution threads T1 ... Tn, the processing device 110 may respond in any number of ways. For example, the processing device 110 may ignore the interrupt fiq_t1, irq_t1, ... fiq_tn, irq_tn. The processing device 110 may instead queue the interrupt fiq_t1, irq_t1, ... fiq_tn, irq_tn into a buffer for later processing upon completion of processing of enabled master thread T0. In other embodiments, the processing device 110 may respond by immediately switching to handle the interrupt fiq_t1, irq_t1, ... fiq_tn, irq_tn without completing, at least at that time, processing of enabled master thread T0.

Figure 5:
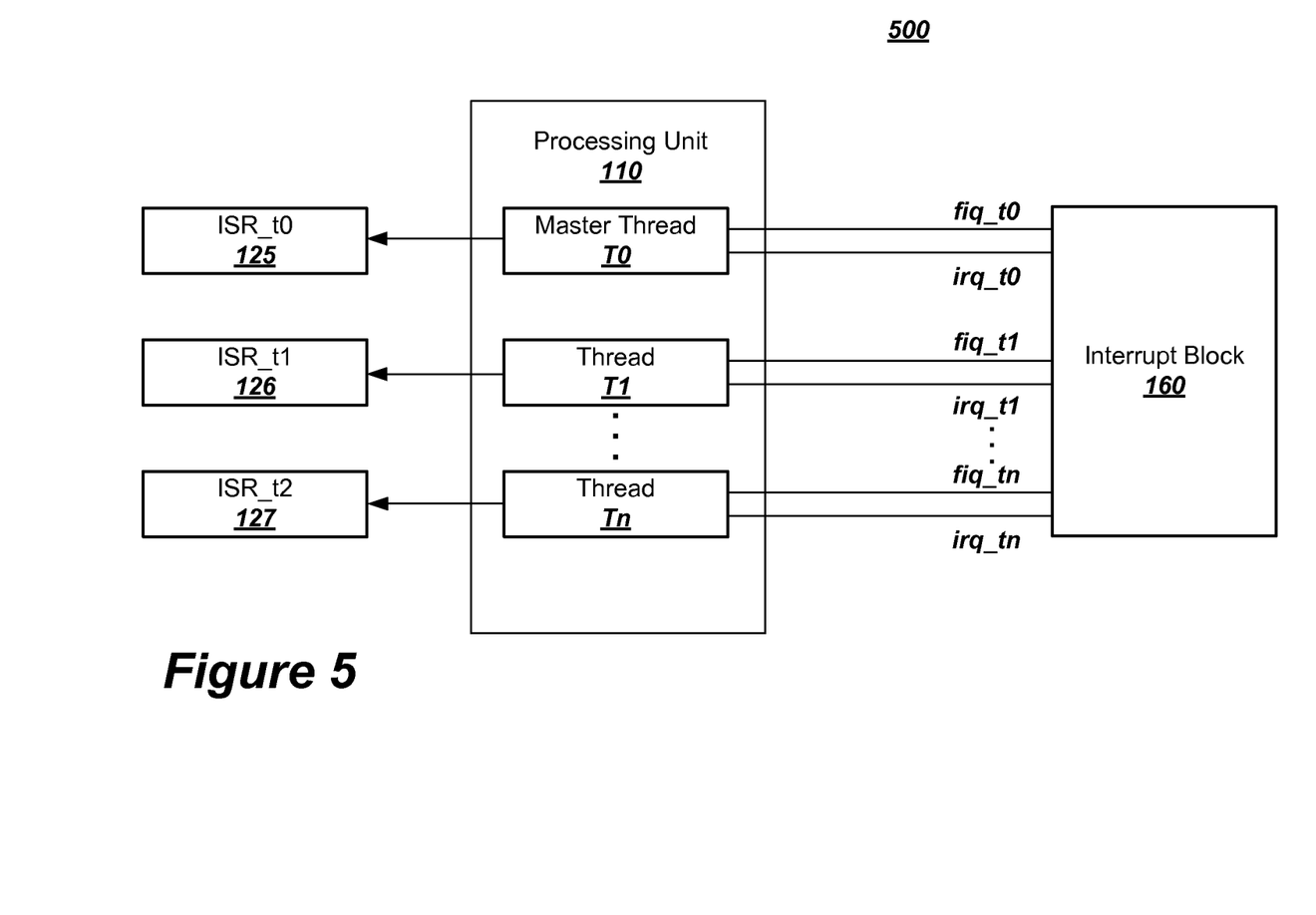
FIG. 5 illustrates a block diagram of interrupt handling of another multi-thread device in accordance with various embodiments of the present invention.

Turning now to FIG. 5, illustrated is another embodiment of a multi-thread device 500. Multi-thread device 500 may be configured so that each instruction execution thread T0, T1, ... Tn handles its own interrupts fiq_t0, irq_t0, ... fiq_tn, irq_tn. Upon receiving an interrupt fiq_t0, irq_t0, ... fiq_tn, irq_tn, the associated instruction execution thread T0, T1, ... Tn may process its own unique interrupt service routine 125, 126, 127. Interrupt service routines 125, 126, 127 may each be stored/located at unique memory locations. For example, interrupt service routine 125 may start or may be located/stored at a first memory address, interrupt service routine 126 may start or may be stored/located at a second memory address, different from the location of the first memory address, and interrupt service routine 126 may start or may be stored/located at another memory address, different from locations of both the first and the second memory addresses. For example, in embodiments, each of instruction execution threads T0, T1, ... Tn may include their own unique interrupt vector address offset in a thread control register. A thread control register may have an interrupt vector address offset 11-bits wide, the least significant bit corresponding to bit 5 of the memory address, and if the offset value for thread Tn is set to 0x008, the actual memory address may be 0x0000_0100. The actual interrupt vector addresses for thread Tn will be 0x0000_0118 for IRQ interrupts and 0x0000_011C for FIQ interrupts, and in high vector mode, 0xFFFF_0118 for IRQ interrupts and 0xFFFF_011C for FIQ interrupts. In various other embodiments, however, an interrupt vector address offset may include any number of bits (e.g., 32 bits).

One or more of the threads T0, T1, ... Tn may be configured to handle interrupts fiq_t0, irq_t0, ... fiq_tn, irq_tn according to a prioritization scheme to allow an interrupt fiq_t0, irq_t0, ... fiq_tn, irq_tn to be handled quickly. If a thread T0, T1, ... or Tn is configured with prioritized interrupt handling and is processing an interrupt fiq_t0, irq_t0, ... fiq_tn, irq_tn using an interrupt service routine, thread switching is disabled for the thread T0, T1, ... or Tn until the interrupt service routine is completed.

In other embodiments, if a thread T0, T1, ... or Tn is not configured with prioritized interrupt handling and is processing an interrupt fiq_t0, irq_t0, ... fiq_tn, irq_tn using an interrupt service routine, another thread T0, T1, ... or Tn may be allowed to process another thread even if the interrupt fiq_t0, irq_t0, ... fiq_tn, irq_tn has not completed processing. The interrupt fiq_t0, irq_t0, ... fiq_tn, irq_tn may be continued to be processed by the thread T0, T1, ... or Tn but may only do so as the thread T0, T1, ... or Tn uses its normally-allocated processing cycles. The mode of the thread T0, T1, ... or Tn processing the interrupt fiq_t0, irq_t0, ... fiq_tn, irq_tn may be saved by processing device 110 and may disable the thread T0, T1, ... or Tn processing the interrupt fiq_t0, irq_t0, ... fiq_tn, irq_tn to switch to another process until the thread T0, T1, ... or Tn returns to its pre-interrupt mode. A mode may include any state of processing device 110 including, for example, user mode, supervisor mode, system mode, etc., and/or may include various permission levels.

Figure 6:
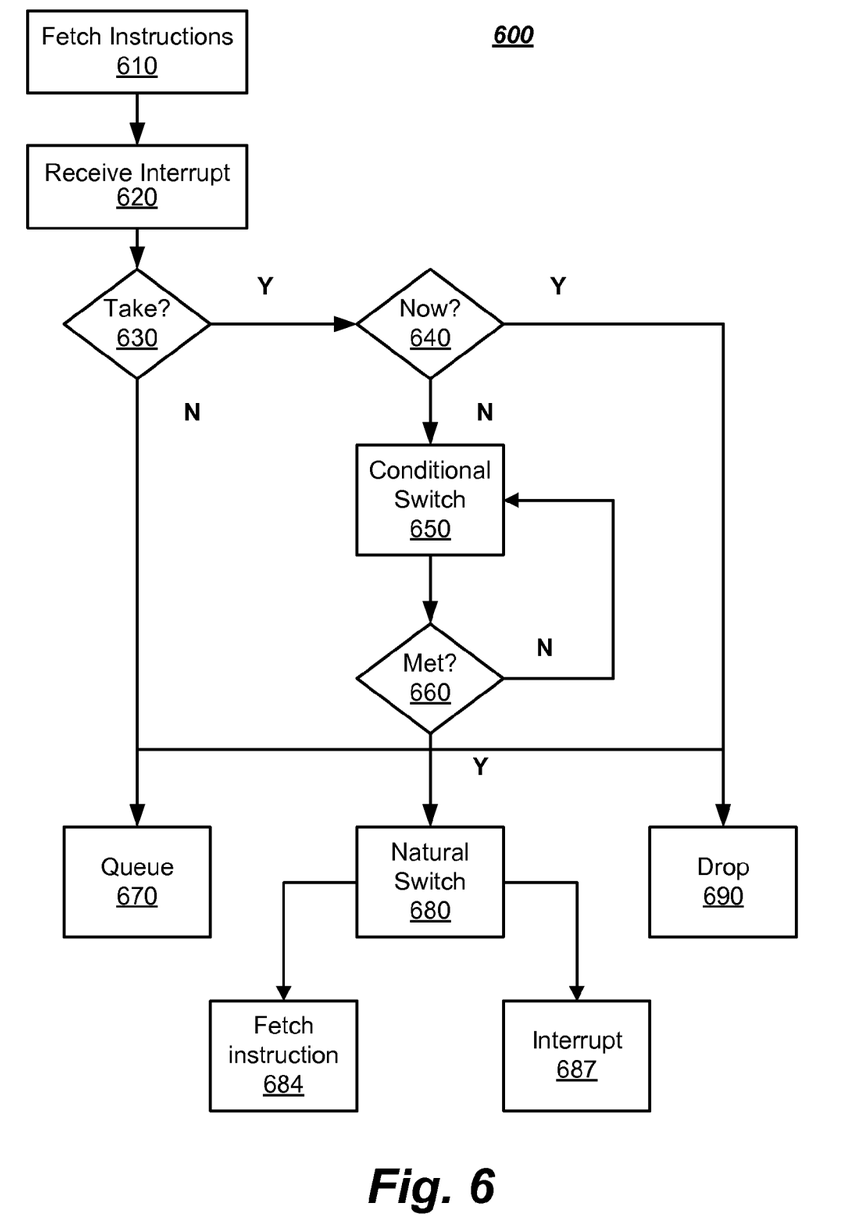
FIG. 6 illustrates a flow diagram view of a portion of the operations associated with interrupt handling of a multi-thread device in accordance with various embodiments of the present invention.

Turning now to FIG. 6, a method in accordance with various embodiments is described in terms of computer firmware, software, and hardware with reference to a flow diagram. Portions of the method to be performed by a processing device may constitute state machines or computer programs made up of computer-executable instructions. These instructions are typically maintained in a storage medium accessible by the processing device. Describing the method by reference to a flow diagram enables one skilled in the art to develop such programs including such instructions to carry out the method, and other methods in accordance with various embodiments of the present invention, on suitably configured processing devices, such as a multithread processor of a computing device executing the instruction execution threads from machine-accessible media. The computer-executable instructions may be written in a computer programming language or may be embodied in firmware logic. If written in a programming language conforming to a recognized standard, such instructions can be executed on a variety of hardware platforms and for interface to a variety of operating systems, such as multithread aware and non-multithread operating systems.

The various embodiments are not described with reference to any particular programming language. It will be appreciated that a variety of programming languages may be used to implement the teachings of at least one embodiment of the invention as described herein. Furthermore, it is common in the art to speak of software, in one form or another (e.g., program, procedure, process, application, etc.), as taking an action or causing a result. Such expressions are merely a shorthand way of saying that execution of the software by a network device causes the processor of the computer to perform an action or a produce a result.

Illustrated in FIG. 6 is a flow diagram of a portion of the operations associated with interrupt handling by a multi-thread processing system 600 (e.g., such as ones previously described with reference to FIGS. 1-5), in accordance with various embodiments. As illustrated, the multi-thread processing system 600 fetches and issues instructions of one or more instruction execution thread to an execution block for execution in block 610. The multi-thread processing system 600 may fetch and issue a first one or more instructions of a first instruction execution thread to an execution block for execution, and fetch and issue a second one or more instructions of a second instruction execution thread to an execution block for execution. The multi-thread processing system 600 may fetch and issue instructions for more or less instruction execution threads, depending on the application.

As illustrated in block 620, the multi-thread processing system 600 receives an interrupt, and in query block 630, the multi-thread processing system 600 determines whether to handle the interrupt. If the received interrupt is not handled, the denied interrupt may be selectively queued in block 670 for later action, naturally switched in block 680 upon expiration of the current thread, and/or dropped (i.e., not processed) in block 690.

If the multi-thread processing system 600 handles the interrupt, the multi-thread processing system 600 may further determine whether to handle the interrupt immediately or at some later point in time in block 640. The multi-thread processing system 600 may handle an interrupt immediately by ceasing, without further instruction execution, an instruction execution thread and switching to an interrupt service routine. However, the multi-thread processing system 600 may immediately handle an interrupt by first executing one or more instructions before transitioning The multi-thread processing system 600 may be configured to store the last-executed instruction or next instruction to be executed of the instruction execution thread for resuming the execution of the instruction execution thread upon completion of an interrupt service routine.

If the interrupt is not immediately handled, the multi-thread processing system 600 may impose a conditional switch in block 650 indicating when the interrupt may be handled. For example, in embodiments, the multi-thread processing system 600 may impose a condition that switching may not occur until execution of one or more instructions of an instruction execution thread. In any event, once the condition is met/satisfied in query block 660, the multi-thread processing system 600 may determine how the interrupt request should be selectively handled. More specifically, the multi-thread processing system 600 may determine whether the interrupt request should be sent to the queue in block 670, the natural switch in block 680, or dropped in block 690.

If the interrupt is sent to the queue in block 670 by the multi-thread processing system 600, the interrupt may later be resent by the interrupt block. A separate queue may exist for each thread, thus if the interrupt is intended for another thread, it may be sent to the queue associated with that thread.

If the interrupt is sent to the natural switch in block 680 by the multi-thread processing system 600, the interrupt may be evaluated at the next thread switch. Upon preparing to switch threads, the interrupt block may either interrupt the multi-thread processing system 600 in block 687. Alternatively, the multi-thread processing system 600 may fetch the next instruction from the next thread in block 684 if the interrupt is no longer relevant or does not have sufficient priority to interrupt the next thread.

Otherwise, the multi-thread processing system 600 may drop the interrupt request in block 690. In many configurations, interrupts may be resent if they continue to be considered significant by the interrupt block or the device generating the interrupt. As such, dropping an interrupt may not impede the effectiveness of the multi-thread processing system 600.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method for handling interrupts of multiple instruction threads within a multi-thread processing environment, the method comprising:

interleavingly fetching and issuing instructions of a plurality of instruction execution threads for execution by an execution block of the multi-thread processing environment, wherein the plurality of instruction execution threads comprises (i) a subset of the plurality of instruction execution threads and (ii) a first instruction execution thread that is not included in the subset of the plurality of instruction execution threads;

for each of the plurality of instruction execution threads, providing a corresponding interrupt signal via a corresponding interrupt signal line within the multi-thread processing environment to interrupt fetching and issuing of instructions of the corresponding instruction execution thread, such that a plurality of interrupt signals via a corresponding plurality of interrupt signal lines are provided for the corresponding plurality of instruction execution threads;

masking the subset of the plurality of instruction execution threads, such that each of the subset of the plurality of instruction threads ignores the corresponding interrupt signal; and in response to masking the subset of the plurality of instruction execution threads, processing, by the first instruction execution thread, one or more interrupt signals corresponding to one or more instruction execution threads of the subset of the plurality of instruction execution threads, wherein the plurality of interrupt signal lines are physically separate and distinct signal lines.

2. The method of claim 1, wherein the plurality of interrupt signal lines are directly electrically coupled to one another.

3. The method of claim 1, further comprising:

while processing the one or more of the interrupt signals, disabling fetching and issuing of instructions of each of the plurality of instruction execution threads.

4. The method of claim 1, wherein processing the one or more of the interrupt signals further comprises:
processing the one or more of the interrupt signals either (i) during masking the subset of the plurality of instruction execution threads or (ii) subsequent to an end of masking the subset of the plurality of instruction execution threads.

5. The method of claim 1, wherein processing the one or more of the interrupt signals further comprises:
processing the one or more of the interrupt signals by fetching and issuing instructions of at least one interrupt service routine.

6. The method of claim 5, wherein the at least one interrupt service routine is a shared interrupt service routine that services the plurality of interrupt signals.

7. The method of claim 1, wherein processing the one or more of the interrupt signals further comprises:
while fetching and issuing of instructions of the first instruction execution thread, processing the one or more of the interrupt signals.

8. The method of claim 1, wherein processing the one or more of the interrupt signals further comprises:
while fetching and issuing of instructions of the first instruction execution thread, receiving the one or more of the interrupt signals;
while fetching and issuing of instructions of the first instruction execution thread, queuing the received one or more of the interrupt signals; and
subsequent to completing the fetching and issuing of instructions of the first instruction execution thread, processing the queued one or more of the interrupt signals.

9. An article of manufacture comprising a non-transitory storage medium having instructions stored thereon that, when executed, cause a multi-thread processing environment to:
interleavingly fetch and issue instructions of a plurality of instruction execution threads for execution by an execution block of the multi-thread processing environment, wherein the plurality of instruction execution threads comprises (i) a subset of the plurality of instruction execution threads and (ii) a first instruction execution thread that is not included in the subset of the plurality of instruction execution threads;
for each of the plurality of instruction execution threads, provide a corresponding interrupt signal via a corresponding interrupt signal line within the multi-thread processing environment to interrupt fetching and issuing of instructions of the corresponding instruction execution thread, such that a plurality of interrupt signals via a corresponding plurality of interrupt signal lines are provided for the corresponding plurality of instruction execution threads;
mask the subset of the plurality of instruction execution threads, such that each of the subset of the plurality of instruction threads ignores the corresponding interrupt signal; and
in response to masking the subset of the plurality of instruction execution threads, process, by the first instruction execution thread, one or more interrupt signals corresponding to one or more instruction execution threads of the subset of the plurality of instruction execution threads,
wherein the plurality of interrupt signal lines are physically separate and distinct signal lines.

10. The article of manufacture of claim 9, wherein:
the plurality of interrupt signal lines are directly electrically coupled to one another.

11. The article of manufacture of claim 9, wherein the instructions, when executed, further cause the multi-thread processing environment to:
while processing the one or more of the interrupt signals, disable fetching and issuing of instructions of each of the plurality of instruction execution threads.

12. The article of manufacture of claim 9, wherein the instructions, when executed, further cause the multi-thread processing environment to process the one or more of the interrupt signals by:
processing the one or more of the interrupt signals either (i) during masking the subset of the plurality of instruction execution threads or (ii) subsequent to an end of masking the subset of the plurality of instruction execution threads.

13. The article of manufacture of claim 9, wherein the instructions, when executed, further cause the multi-thread processing environment to process the one or more of the interrupt signals by:
fetching and issuing instructions of at least one interrupt service routine.

14. The article of manufacture of claim 13, wherein the at least one interrupt service routine is a shared interrupt service routine that services the plurality of interrupt signals.

15. The article of manufacture of claim 9, wherein the instructions, when executed, further cause the multi-thread processing environment to process the one or more of the interrupt signals by:
while fetching and issuing of instructions of the first instruction execution thread, processing the one or more of the interrupt signals.

16. The article of manufacture of claim 9, wherein the instructions, when executed, further cause the multi-thread processing environment to process the one or more of the interrupt signals by:
while fetching and issuing of instructions of the first instruction execution thread, receiving the one or more of the interrupt signals;
while fetching and issuing of instructions of the first instruction execution thread, queuing the received one or more of the interrupt signals; and
subsequent to completing the fetching and issuing of instructions of the first instruction execution thread, processing the queued one or more of the interrupt signals.

17. A method for handling interrupts of multiple instruction threads within a multi-thread processing environment, the method comprising:
interleavingly fetching and issuing instructions of a plurality of instruction execution threads for execution by an execution block of the multi-thread processing environment, wherein the plurality of instruction execution threads comprises (i) a subset of the plurality of instruction execution threads and (ii) a first instruction execution thread that is not included in the subset of the plurality of instruction execution threads;
for each of the plurality of instruction execution threads, providing a corresponding interrupt signal via a corresponding interrupt signal line within the multi-thread processing environment to interrupt fetching and issuing of instructions of the corresponding instruction execution thread, such that a plurality of interrupt signals via a corresponding plurality of interrupt signal lines are provided for the corresponding plurality of instruction execution threads;

masking the subset of the plurality of instruction execution threads, such that each of the subset of the plurality of instruction threads ignores the corresponding interrupt signal; and in response to masking the subset of the plurality of instruction execution threads, processing, by the first instruction execution thread, one or more interrupt signals corresponding to one or more instruction execution threads of the subset of the plurality of instruction execution threads, wherein the plurality of interrupt signal lines are directly electrically coupled to one another.

18. An article of manufacture comprising a non-transitory storage medium having instructions stored thereon that, when executed, cause a multi-thread processing environment to:

interleavingly fetch and issue instructions of a plurality of instruction execution threads for execution by an execution block of the multi-thread processing environment, wherein the plurality of instruction execution threads comprises (i) a subset of the plurality of instruction execution threads and (ii) a first instruction execution thread that is not included in the subset of the plurality of instruction execution threads;

for each of the plurality of instruction execution threads, provide a corresponding interrupt signal via a corresponding interrupt signal line within the multi-thread processing environment to interrupt fetching and issuing of instructions of the corresponding instruction execution thread, such that a plurality of interrupt signals via a corresponding plurality of interrupt signal lines are provided for the corresponding plurality of instruction execution threads;

mask the subset of the plurality of instruction execution threads, such that each of the subset of the plurality of instruction threads ignores the corresponding interrupt signal; and in response to masking the subset of the plurality of instruction execution threads, process, by the first instruction execution thread, one or more interrupt signals corresponding to one or more instruction execution threads of the subset of the plurality of instruction execution threads, wherein the plurality of interrupt signal lines are directly electrically coupled to one another.

* * * * *